(12) United States Patent
Fluman et al.

(10) Patent No.: US 9,875,037 B2
(45) Date of Patent: Jan. 23, 2018

(54) IMPLEMENTING MULTIPLE RAID LEVEL CONFIGURATIONS IN A DATA STORAGE DEVICE

(71) Applicant: International Business Machines Corporation, Armonk, NY (US)

(72) Inventors: Mudi M. Fluman, Haifa (IL); Yaacov Frank, Ramot Meir (IL); Yehuda Shiran, Haifa (IL); Ronny Vatelmacher, Hod-Hashron (IL)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 14/742,736

(22) Filed: Jun. 18, 2015

(65) Prior Publication Data

US 2016/0371013 A1 Dec. 22, 2016

(51) Int. Cl.
*G06F 9/45* (2006.01)
*G06F 12/08* (2016.01)
*G06F 12/0808* (2016.01)
*G06F 12/0815* (2016.01)
*G06F 3/06* (2006.01)
*G06F 11/10* (2006.01)

(52) U.S. Cl.
CPC .......... *G06F 3/0611* (2013.01); *G06F 3/0659* (2013.01); *G06F 3/0689* (2013.01); *G06F 11/1076* (2013.01)

(58) Field of Classification Search
CPC .... G06F 3/0659; G06F 3/0613; G06F 3/0689; G06F 12/0246; G06F 3/061
USPC ....................................... 711/114
See application file for complete search history.

(56) References Cited

U.S. PATENT DOCUMENTS

| 5,075,804 | A | 12/1991 | Deyring |
| 5,613,088 | A * | 3/1997 | Achiwa ............... G06F 11/1076 360/53 |
| 5,659,677 | A | 8/1997 | Cohn et al. |
| 6,204,660 | B1 | 3/2001 | Lee |
| 6,256,713 | B1 * | 7/2001 | Audityan ............... G06F 13/18 711/141 |
| 6,344,938 | B1 | 2/2002 | Smith |
| 6,446,156 | B1 | 9/2002 | Chia et al. |
| 6,457,096 | B1 | 9/2002 | Ageishi et al. |
| 6,546,499 | B1 | 4/2003 | Challener et al. |
| 6,751,757 | B2 | 6/2004 | Biskup et al. |

(Continued)

OTHER PUBLICATIONS

Hu et al., "MHPR: Multi-head Parallelism and Redundancy Disk Model", 2009 IEEE International Conference on Networking, Architecture, and Storage, NAS 2009, pp. 315-322, DOI: 10.1109/NAS.2009.60, © 2009 IEEE.

*Primary Examiner* — Tuan Thai
*Assistant Examiner* — Mohamed Gebril
(74) *Attorney, Agent, or Firm* — Robert C. Bunker

(57) ABSTRACT

Embodiments of the present invention provide systems, methods, and computer program products for implementing multiple raid level configurations in a computer storage device. In one embodiment, performance or resiliency of application data being executed to a single computer storage device can be prioritized. Embodiment of the present invention provide systems, methods, and computer program products for a recovery operation, responsive to determining to prioritize performance of application data being executed to the single computer storage device.

20 Claims, 6 Drawing Sheets

(56) References Cited

U.S. PATENT DOCUMENTS

| | | | |
|---|---|---|---|
| 6,782,410 B1* | 8/2004 | Bhagat | G06F 9/5027 709/201 |
| 6,842,377 B2* | 1/2005 | Takano | G11C 7/1021 365/185.21 |
| 7,017,011 B2* | 3/2006 | Lesmanne | G06F 12/082 711/141 |
| 7,196,942 B2* | 3/2007 | Khurana | G11C 7/1051 326/38 |
| 7,245,445 B2 | 7/2007 | Lee | |
| 7,269,715 B2* | 9/2007 | Le | G06F 9/3802 712/215 |
| 7,321,955 B2* | 1/2008 | Ohmura | G06F 12/0804 711/113 |
| 7,512,736 B1* | 3/2009 | Overby | G06F 3/0607 707/999.202 |
| 7,587,631 B2 | 9/2009 | Shimmitsu | |
| 7,694,188 B2 | 4/2010 | Raghuraman et al. | |
| 7,770,076 B2 | 8/2010 | Mills et al. | |
| 7,971,093 B1 | 6/2011 | Goel et al. | |
| 7,992,035 B2 | 8/2011 | Daikokuya et al. | |
| 8,230,193 B2* | 7/2012 | Klemm | G06F 3/0608 711/114 |
| 8,566,546 B1* | 10/2013 | Marshak | G06F 3/0604 711/112 |
| 8,990,527 B1* | 3/2015 | Linstead | G06F 3/0617 711/161 |
| 2003/0051110 A1 | 3/2003 | Gaspard et al. | |
| 2004/0068621 A1* | 4/2004 | Van Doren | G06F 12/0828 711/144 |
| 2004/0179386 A1 | 9/2004 | Jun | |
| 2005/0125607 A1* | 6/2005 | Chefalas | G06F 12/0862 711/113 |
| 2005/0283653 A1 | 12/2005 | Noguchi et al. | |
| 2006/0112247 A1 | 5/2006 | Ramany et al. | |
| 2007/0008328 A1* | 1/2007 | MacWilliams | G06F 12/0646 345/530 |
| 2007/0294565 A1 | 12/2007 | Johnston et al. | |
| 2009/0094413 A1* | 4/2009 | Lehr | G06F 3/0605 711/112 |
| 2009/0228648 A1* | 9/2009 | Wack | G06F 11/1092 711/114 |
| 2009/0282101 A1* | 11/2009 | Lim | G06F 9/5077 709/203 |
| 2010/0046267 A1* | 2/2010 | Yan | G11C 16/24 365/51 |
| 2010/0050016 A1* | 2/2010 | Franklin | G06F 11/0727 714/6.32 |
| 2010/0125712 A1* | 5/2010 | Murase | G06F 11/1458 711/162 |
| 2010/0332780 A1* | 12/2010 | Furuya | G06F 3/0689 711/162 |
| 2011/0202735 A1* | 8/2011 | Kono | G06F 11/1451 711/162 |
| 2011/0307745 A1* | 12/2011 | McCune | G06F 17/30221 714/54 |
| 2012/0198107 A1* | 8/2012 | McKean | G06F 13/18 710/40 |
| 2012/0266011 A1 | 10/2012 | Storer et al. | |
| 2013/0007373 A1* | 1/2013 | Beckmann | G06F 12/126 711/136 |
| 2013/0067161 A1* | 3/2013 | Chandra | G06F 13/12 711/114 |
| 2013/0080805 A1* | 3/2013 | Vick | G06F 8/4432 713/320 |
| 2013/0111129 A1* | 5/2013 | Maki | G06F 3/0611 711/117 |
| 2013/0152097 A1* | 6/2013 | Boctor | G06F 9/505 718/103 |
| 2013/0326270 A1* | 12/2013 | Chen | G06F 11/2089 714/6.21 |
| 2014/0003114 A1* | 1/2014 | Pellizzer | H01L 27/2481 365/63 |

* cited by examiner

IMPLEMENTING MULTIPLE RAID LEVEL CONFIGURATIONS IN A DATA STORAGE DEVICE

BACKGROUND OF THE INVENTION

The present invention relates generally to the field of data storage devices, and more particularly to implementing multiple redundant array of disks (RAID) level configurations in a single data storage device.

Computer storage devices, such as hard disk drives (HDDs), and flash storage devices are used for storing and retrieving digital information. HDDs are often designed and implemented with platters and are paired with magnetic heads for storing and retrieving digital information. Multiple HDDs can be utilized in a data storage device environment and can implement various RAID level configurations. Flash storage devices are often designed and implemented with partitions, configured to store and retrieve digital information. Different RAID level configurations may correlate to different magnitudes of resiliency and performance of the data storage device environment. Furthermore, different RAID level configurations may also provide varying resiliency, availability, performance, and capacity for data stored in the data storage devices. Often, RAID level configurations implement parity, an error protection scheme, which is used to provide fault tolerance in a given set of data. Typically, a RAID level configuration prioritizing higher resiliency requires additional data storage devices to effectively distribute digital information and parity information among those data storage devices.

SUMMARY

Embodiments of the present invention provide systems, methods, and program products for implementing multiple raid level configurations in a computer storage device. In one embodiment of the present invention, a method is provided comprising: receiving an application transaction to be executed to a first portion of a computer storage device, wherein the first portion of the computer storage device is configured to store application data; generating at least one Redundant Array of Independent Disks (RAID) transaction associated with the application transaction to be executed to a second portion of the computer storage device, wherein the second portion of the computer storage device is configured to store parity data of the application data; storing the application transaction to be executed to the first portion of the computer storage device in a first buffer; responsive to determining that a storage capacity of a second buffer configured to store RAID transactions reaches a threshold, determining whether to prioritize execution of the application transaction to the first portion of the computer storage device or to prioritize execution of RAID transactions to the second portion of the computer storage device; responsive to determining to prioritize execution of the application transaction to the first portion of the computer storage device, performing a write-through operation for the application transaction to the first portion of the computer storage device; and responsive to determining to prioritize execution of RAID transactions to the second portion of the computer storage device, executing at least one RAID transaction stored in the second buffer to the second portion of the computer storage device.

DETAILED DESCRIPTION

Embodiments of the present invention provide methods, systems, and computer program products to manage one or more redundant array of independent disks (RAID) level configurations in a single storage device. Embodiments of the present invention provide methods, systems, and computer program products to help prioritize performance of the single storage device or resiliency of the single storage device. In this manner, as discussed in greater detail later in this specification, embodiments of the present invention can be used to determine a manner in which to process application data and parity data of the application data, responsive to determining whether to prioritize performance or resiliency of the single storage device.

Figure 1:
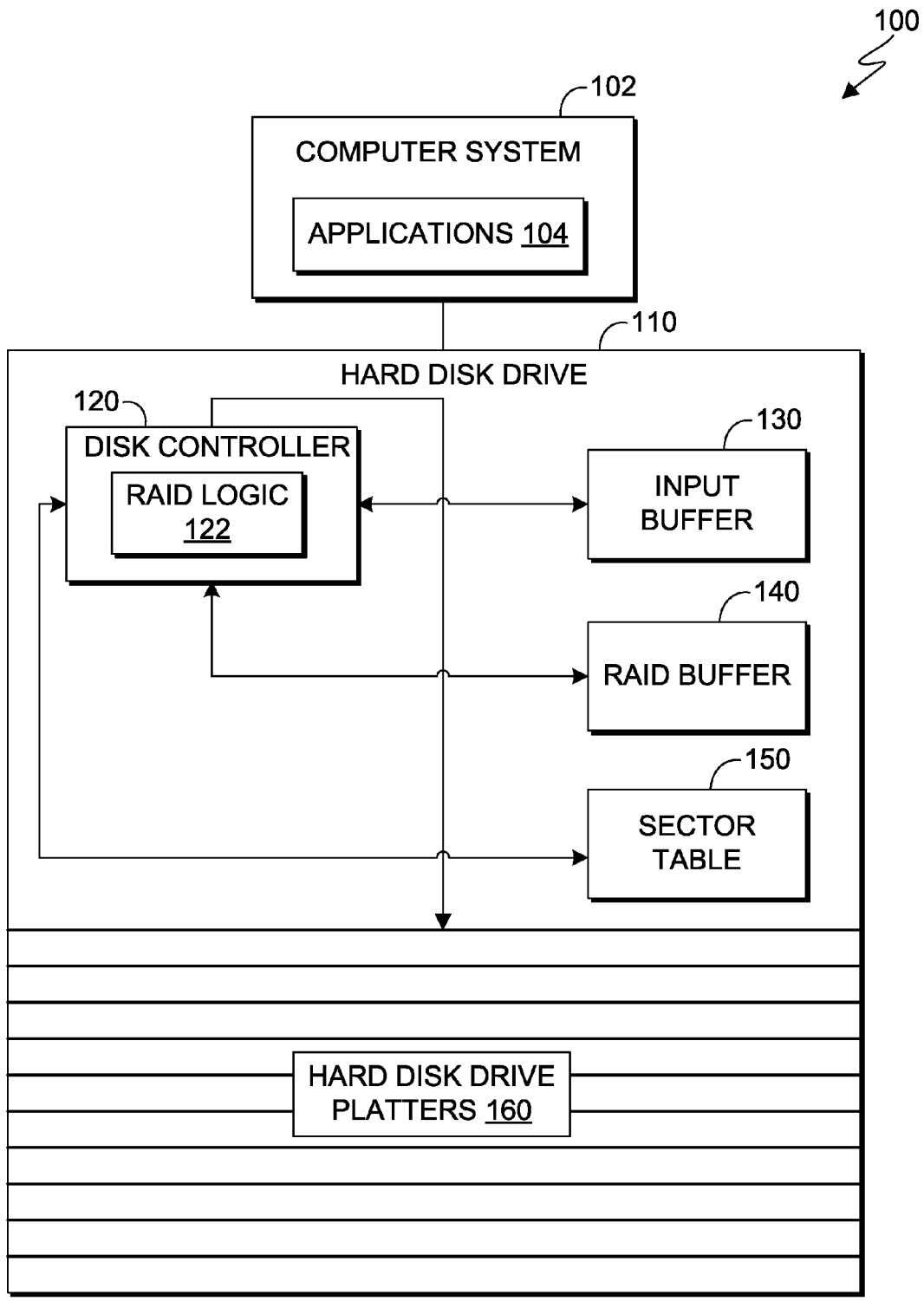
FIG. 1 is a block diagram of a data storage device environment, in accordance with an embodiment of the present invention.

FIG. 1 is a functional block diagram of computing environment 100 in accordance with an embodiment of the present invention. Computing environment 100 includes computer system 102 and hard disk drive (HDD) 110. Computer system 102 may be a desktop computer, laptop computer, specialized computer server, or any other computer system known in the art. In this embodiment, computer system 102 includes applications 104 and hard disk drive (HDD) 110. In general, computer system 102 is representative of any electronic device, or combination of electronic devices, capable of executing machine-readable program instructions, as described in greater detail with regard to FIG. 6.

HDD 110 is a computer storage device for computer system 102. In this embodiment, HDD 110 includes disk controller 120, input buffer 130, RAID buffer 140, sector table 150, and HDD platters 160. HDD 110 and components therein store application data and parity data of the application data. Furthermore, HDD 110 is configured to support a plurality of RAID level configurations. For example, a RAID 5 level configuration may be implemented by HDD 110. In this instance, RAID transactions are executed to a plurality of HDD platters 160 (i.e., distributed parity). In another example, multiple RAID level configurations may be implemented by HDD 110 (i.e., a RAID 2 and a RAID 5 configuration), such that at least one of HDD platters 160 contains one or more executed RAID transactions (e.g., dedicated parity, distributed parity, double distributed parity, byte-level striping, block-level striping, etc.).

Applications 104 generate application data to be written to HDD platters 160. Furthermore, applications 104 use application data. In one embodiment, the application data used by applications 104 can be read from HDD platters 160. In this embodiment, applications 104 transmit application data to and from HDD 110 and components therein.

Disk controller 120 manages processing of application data and parity data of the application data. In this embodiment, disk controller 120 contains RAID logic 122 to help manage execution of the one or more application transactions and one or more associated RAID transactions to HDD platters 160. The term "transaction," as used herein, refers to either an executable read or write operation to facilitate processing of data (e.g., application data, parity data, etc.). For example, processing application data involves executing one or more read/write operations that may be represented by one or more application transactions. Furthermore, disk controller 120 may generate parity data for the application data. Similarly, processing parity data involves executing one or more read/write operations that may be represented by one or more RAID transactions. In certain embodiments, disk controller 120 and components therein are configured to determine an operational status of HDD 110 (i.e., whether HDD 110 is under a large computational load, based, at least in part, on a number of unexecuted transactions stored in input buffer 130 and RAID buffer 140). In another embodiment, disk controller 120 and components therein are configured to determine an operational status of computer storage devices other than HDD 110, such as a flash storage device.

Input buffer 130 contains a plurality of entries storing incoming and outgoing application data, represented by one or more application transactions. In this embodiment, the one or more application transactions stored in input buffer 130, are based, at least in part on, processing application data from applications 104. For example, disk controller 120 may process the application data into one or more application transactions and store the one or more application transactions into input buffer 130.

RAID buffer 140 contains a plurality of entries, wherein each entry may store incoming and outgoing parity data, represented by one or more RAID transactions. In an embodiment, disk controller 120 may generate parity data and store the one or more RAID transactions in RAID buffer 140 until a condition is met, as described in greater detail with regard to FIGS. 2-4. Furthermore, prior to the one or more RAID transactions executed to HDD platters 160, disk controller 120 interacts with RAID buffer 140. The one or more RAID transactions in RAID buffer 140 are executed to HDD platters 160 to ensure parity data is synchronized and resiliency is maintained in HDD 110.

Sector table 150 is used to identify one or more RAID transactions to be executed to HDD platters 160 during a recovery operation. For example, a recovery operation may occur subsequent to performing a write-through operation (i.e., executing one or more application transactions without executing one or more associated RAID transactions to HDD platters 160). In this instance, sector table 150 is referenced during the recovery operation to execute one or more RAID transactions to HDD platters 160, as described in greater detail with regard to FIGS. 5 and 6. In general, sector table 150 can be implemented with any suitable storage architecture known in the art, such as a relational database, an object-oriented database, and/or one or more tables.

HDD platters 160 contain information in the form of binary units. In this embodiment, read/write heads are provided for each one of HDD platters 160. Furthermore, application and/or RAID transactions can be executed to each one of HDD platters 160 independently. In general, HDD platters 160 are magnetic disks capable of storing machine-readable program instructions, as described in greater detail with regard to FIG. 6.

It should be understood that, for illustrative purposes, FIG. 1 does not show other computer systems and elements which may be present when implementing embodiments of the present invention. For example, while FIG. 1 shows a number of HDD platters 160. In other embodiments, a greater or lesser number of HDD platters 160 may be implemented by data storage environment 100.

Similarly, in other embodiments, computing environment 100 can be implemented with different types of computer storage devices other than HDD 110, including flash storage devices. In one embodiment, application and/or RAID transactions can be executed to one or more portions (e.g., partitions) of a flash storage device. For example, the flash storage device may be configured such that RAID logic 122 executes application transactions to a first partition of one or more partitions of the flash storage device, and RAID logic 122 may execute RAID transactions to a second partition of one or more partitions of the flash storage device. Furthermore, computing environment 100 may implement a table during a write-through and recovery operation for the flash storage device, other than sector table 150. For example, the table may identify one or more partitions, or one or more logical block addresses (LBA), of application transactions executed to the one or more portions of the flash storage device during a write-through operation, as described in greater detail with regard to FIG. 4. In general, the table can be implemented with any suitable storage architecture known in the art, such as a relational database, an object-oriented database, and/or one or more tables.

Figure 2:
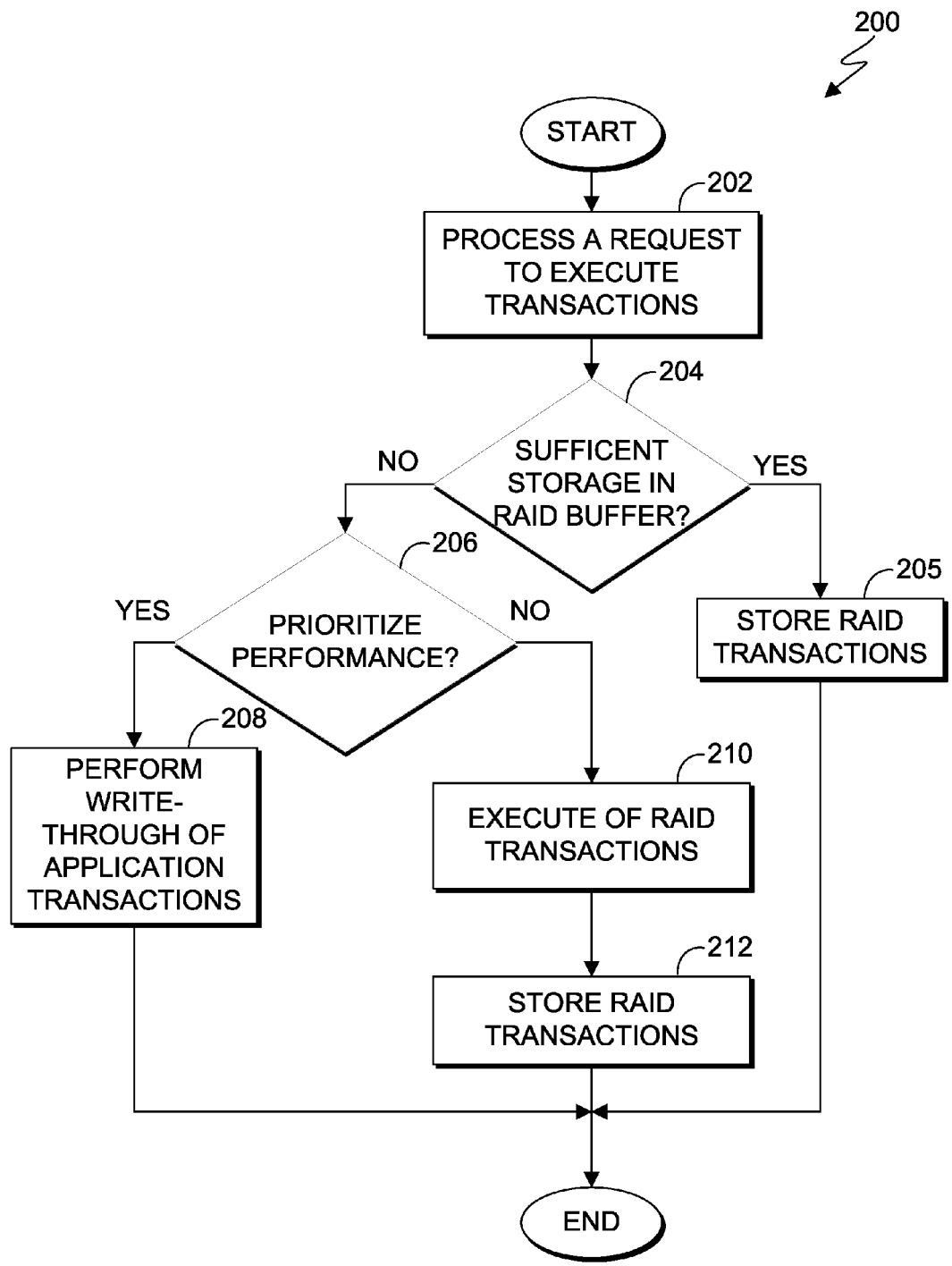
FIG. 2 is a flowchart illustrating operational steps for processing RAID transactions, in accordance with an embodiment of the present invention.

FIG. 2 is a flowchart 200 illustrating operational steps for processing RAID transactions, in accordance with an embodiment of the present invention. In this embodiment, disk controller 120 implements RAID logic 122 to help manage execution of application transactions and RAID transactions to HDD platters 160. In one embodiment, RAID logic 122 may manage execution of application transactions and RAID transactions to one or more portions of a computer storage device, other than HDD 110. For example, disk controller 120 may implement RAID logic 122 to help manage execution of application transactions and RAID transactions to one or more partitions of a flash storage device.

In step 202, RAID logic 122 processes a request to execute one or more application transactions. In this embodiment, applications 104 transmit application data and a request to process the application data to HDD 110 and components therein. Furthermore, the application data may be represented by one or more application transactions stored in input buffer 130. Accordingly, RAID logic 122 processes the request to execute the one or more application transactions, and generates one or more RAID transactions (i.e., the one or more RAID transactions represent parity data of the application data).

In step 204, RAID logic 122 determines whether sufficient storage in RAID buffer 140 is available. In this embodiment, RAID logic 122 analyzes entries in RAID buffer 140 to determine whether sufficient storage is available. In another embodiment, RAID logic 122 may determine that sufficient storage in RAID buffer 140 is available, such that the one or more generated RAID transactions can be stored in RAID buffer 140. Furthermore, RAID logic 122 may determine that a number of available entries in RAID buffer 140 are less than the number of entries required to store the one or more generated RAID transactions. In general, RAID logic 122 analyzes RAID buffer 140 to determine whether sufficient storage is available in RAID buffer 140.

If in step 204, RAID logic 122 determines that sufficient storage is available in RAID buffer 140, then in step 206, RAID logic 122 determines whether to prioritize performance of HDD 110. In this embodiment, performance of HDD 110 is represented by a rate at which application data is processed in HDD 110. For example, if the rate at which application data is written and/or read is decreased, then the performance of HDD 110 is decreased. Conversely, if the rate at which application data is written and/or read is increased, then the performance of HDD 110 is increased. In another embodiment, a user specification may specify whether to increase performance of HDD 110.

If in step 204 RAID logic 122 determines that RAID buffer 140 does not have sufficient storage available, then in step 205, RAID logic 122 stores the one or more RAID transactions in RAID buffer 140. Subsequently, an operation may be performed to execute the one or more RAID transactions stored in RAID buffer 140 responsive to a condition (e.g., a schedule, low computational demand of HDD 110, etc.).

If in step 206, RAID logic 122 determines to prioritize performance of HDD 110, then in step 208, RAID logic 122 performs a write-through operation for the one or more application transactions. In this embodiment, the write-through operation involves executing the one or more application transactions to HDD platters 160. Furthermore, RAID logic 122 executes the one or more application transactions to HDD platters 160 prior to processing any of the one or more RAID transactions. Stated differently, RAID logic 122 prioritizes executing application transactions to HDD platters 160, in response to determining to prioritize performance of HDD 110. In another embodiment, the write-through operation may involve executing one or more application transactions to one or more portions of a computer storage device, other than HDD 110. For example, the write-through operation may involve executing the one or more the one or more application transactions to one or more partitions of a flash storage device.

If in step 206, RAID logic 122 determines to not prioritize performance of HDD 110, then in step 210, RAID logic 122 executes one or more RAID transactions. In this embodiment, RAID logic 122 executes one or more RAID transactions to make sufficient storage available in RAID buffer 140, based on certain criteria. For example, the criteria may indicate to make sufficient storage available in RAID buffer 140 for the one or more RAID transactions generated in step 202, by executing older RAID transactions stored in RAID buffer 140. In another example, the criteria may specify an amount of available storage on RAID buffer 140 necessary to proceed with subsequent operations. In certain embodiments, RAID logic 122 may provide an indication to throttle (i.e., suspends) incoming application data, as explained in greater detail with regard to FIG. 3.

In step 212, RAID logic 122 stores the one or more RAID transactions associated with the request (i.e., generated in step 202) in RAID buffer 140. In this embodiment, the one or more RAID transactions are stored in RAID buffer 140 until RAID logic 122 executes the one or more RAID transactions to HDD platters 160, in accordance with a configured RAID scheme (e.g., RAID 1, RAID 2, RAID 3, etc. one or more of HDD platters 160 using one or more of the respective read/write heads) and a set of conditions (e.g., a schedule, low computational demand of HDD 110, etc.). As previously discussed, one or more RAID transactions may be executed to one or more portions of a computer storage device, other than HDD 110. For example, the one or more RAID transactions stored in RAID buffer 140 may be executed by RAID logic 122 to one or more partitions of a flash storage device.

Figure 3:
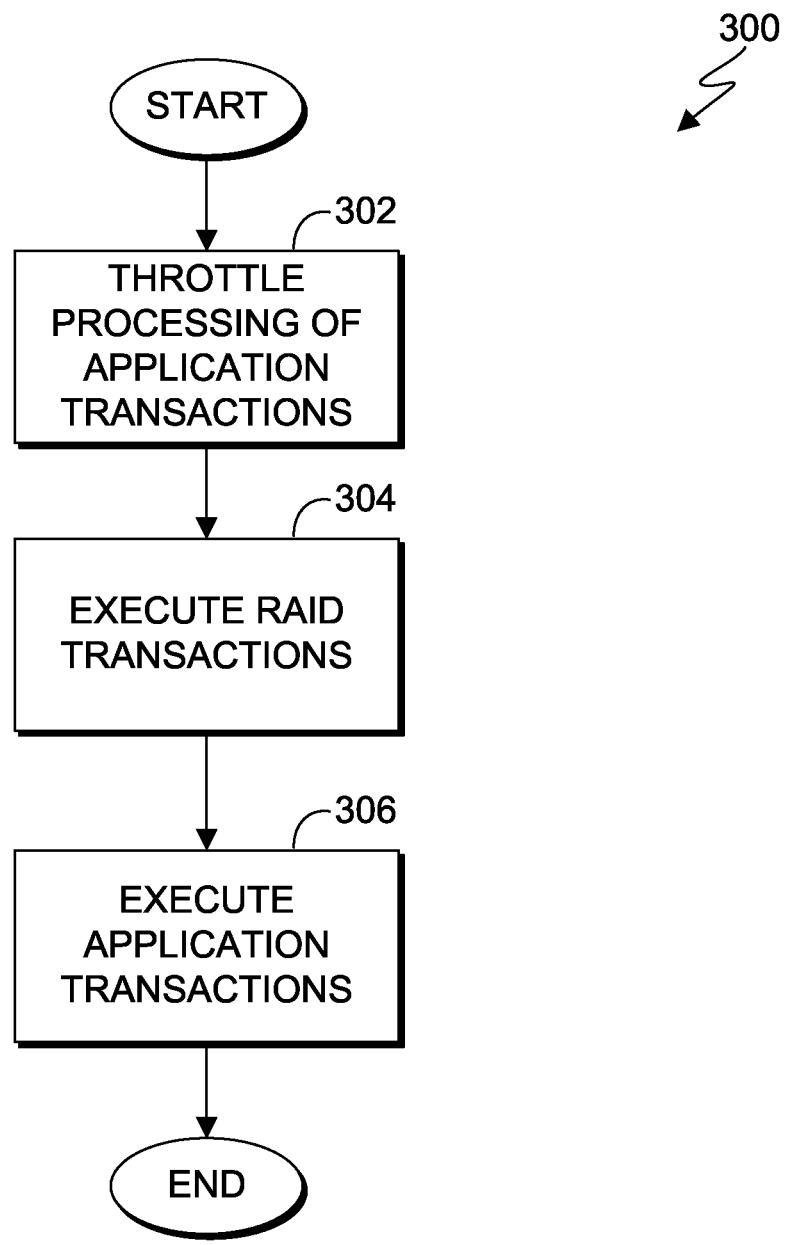
FIG. 3 is a flowchart illustrating operational steps for executing of one or more RAID transactions, in accordance with an embodiment of the present invention.

FIG. 3 is a flowchart 300 illustrating operational steps for executing one or more RAID transactions, in accordance with an embodiment of the present invention. For example, the operational steps of flowchart 300 can be performed at step 210 of flowchart 200. In this embodiment, RAID buffer 140 does not have sufficient memory available, and RAID logic 122 determines not to prioritize performance of HDD 110. Instead, RAID logic 122 prioritizes resiliency of HDD platters 160 by prioritizing execution of RAID transactions to HDD platters 160. Accordingly, RAID logic 122 is implemented to effectively empty RAID buffer 140, such that all of the one or more RAID transactions stored in RAID buffer 140 are executed to HDD platters 160. In another embodiment, RAID logic 122 may be implemented, such that all of the one or more RAID transactions stored in RAID buffer 140 are executed to one or more portions of a computer storage device, other than HDD 110. For example, the one or more RAID transactions stored in RAID buffer 140 may be executed by RAID logic 122 to one or more partitions of a flash storage device.

In step 302, RAID logic 122 throttles (i.e., suspends) processing of incoming application data. In this embodiment, RAID logic 122 throttles processing of incoming application data to prevent input buffer 130 from overflowing. Accordingly, RAID logic 122 penalizes performance of HDD 110 because one or more application transactions are not prioritized for execution to HDD platters 160. In certain embodiments, RAID logic 122 will not throttle processing of incoming application data if RAID buffer 140 is empty (i.e., each of the one or more RAID transactions are executed to HDD platters 160). In other embodiments, RAID logic 122 may penalize performance of a computer storage device, other than HDD 110, because one or more application transactions are not prioritized for execution to one or more portions of the computer storage device. For example, a flash storage device's performance can be penalized by RAID logic 122, such that the one or more application transactions are not prioritized for execution one or more partitions of the flash storage device.

In step 304, RAID logic 122 executes the one or more RAID transactions. In this embodiment, RAID logic 122 is implemented to determine a manner to execute the one or more RAID transactions. For example, tagged command queuing (TCQ) or native command queuing (NCQ) may be a technology utilized by RAID logic 122 and components therein to optimize scheduling for executing the one or more RAID transactions.

In step 306, RAID logic 122 executes the one or more application transactions. In this embodiment, RAID logic 122 signals to continue processing new application data, so long that RAID buffer 140 does not overflow from storing one or more RAID transactions that are based on parity data of the new application data. As previously discussed, RAID logic 122 processes application data into one or more application transactions. Accordingly, RAID logic 122 executes the one or more application transactions to HDD platters 160. In another embodiment, RAID logic 122 may be implemented, such that the one or more application transactions are executed to one or more portions of a computer storage device, other than HDD 110. For example, the one or more application transactions may be executed by RAID logic 122 to one or more partitions of a flash storage device.

Figure 4:
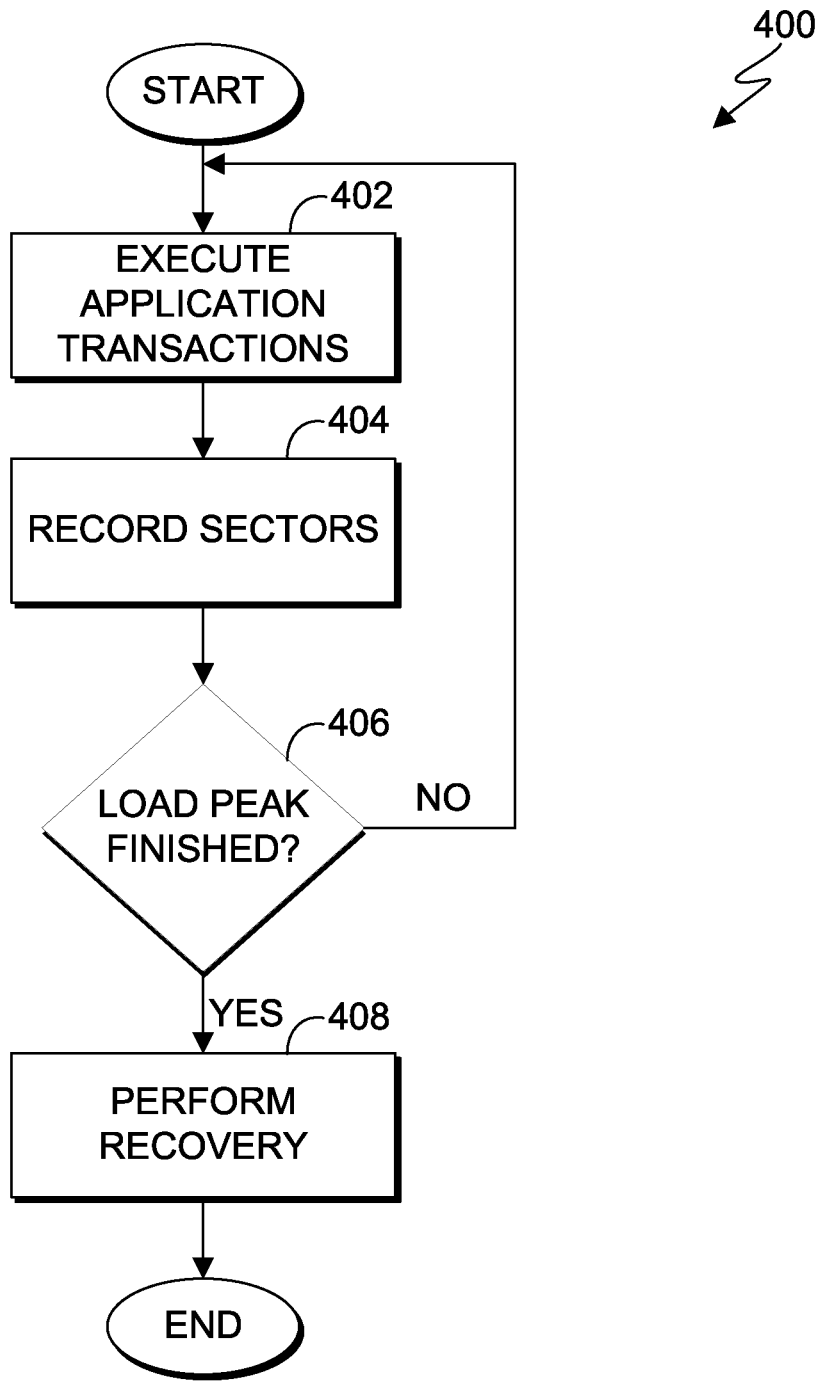
FIG. 4 is a flowchart illustrating operational steps for performing a write-through operation for one or more application transactions, in accordance with an embodiment of the present invention.

FIG. 4 is a flowchart 400 illustrating operational steps for performing a write-through operation for one or more application transactions, in accordance with an embodiment of the present invention. For example, the operational steps of flowchart 400 can be performed at step 208 of flowchart 200. In this embodiment, RAID buffer 140 does not have sufficient storage available, and RAID logic 122 determines to prioritize performance of HDD 110 by prioritizing execution of application transactions to HDD platters 160. Accordingly, RAID logic 122 is implemented to effectively process application data, such that all of the one or more application transactions are executed to HDD platters 160. In another embodiment, RAID logic 122 may be implemented to execute one or more application transactions to one or more portions of a computer storage device, other than HDD 110. For example, the one or more application transactions may be executed by RAID logic 122 to one or more partitions of a flash storage device.

In step 402, RAID logic 122 executes the one or more application transactions. In this embodiment, RAID logic 122 executes the one or more application transactions to HDD platters 160. Furthermore, RAID logic 122 and components therein may utilize TCQ or NCQ technologies to ensure efficient execution scheduling for the one or more application transactions. As previously discussed, RAID logic 122 may execute the one or more application transactions to one or more portions (e.g., partitions) of a type of computer storage device different from HDD 110, such as a flash storage device.

In step 404, RAID logic 122 records information in sector table 150 for one or more sectors of HDD platters 160 involved in the executed application transactions of step 402. In this embodiment, the information recorded in sector table 150 indicates the location of application data for the executed application transactions and allows RAID logic 122 to later (i.e., during recovery) execute RAID transactions associated with the previously executed one or more application transactions to achieve parity of that data. For example, during a write through, two application transactions may be executed to one or more sectors of HDD platters 160 without executing associated RAID transactions. In this instance, RAID logic 122 records in sector table 150 location information about application data in the sectors involved in the application transactions such that the associated RAID transactions can later be executed to achieve parity of that application data. In step 406, RAID logic 122 determines whether a load peak has finished. In one embodiment, the load peak is finished when RAID logic 122 determines that there as an idle time during processing of application data. For example, RAID logic 122 may determine that a load peak has finished when all of the one or more application transactions are executed to HDD platters 160. Furthermore, RAID logic 122 may determine that a load peak has finished when a recovery operation can initiate without impacting (i.e., decreasing) performance of HDD 110. In one embodiment, a computer storage device different from HDD 110 may implement a table, other than sector table 150, to record information for one or more portions of the computer storage device involved in the executed application transactions of step 402. For example, a flash storage device may implement a table to record information for one or more partitions of the flash storage device involved in the executed application transactions. Furthermore, in this instance, the table may record one or more LBAs to identify the one or more partitions of the flash storage device involved in the executed application transactions.

If in step 406 RAID logic 122 determines that the load peak has finished, then in step 408 RAID logic 122 performs a recovery operation. In this embodiment, the recovery operation is used to synchronize the data of the one or more sectors recorded in sector table 150 with parity data. In another embodiment, the recovery operation may be used to synchronize one or more portions recorded in a table, other than sector table 150, with parity data. For example, performing the recovery operation may synchronize the data of one or more partitions recorded in a table with parity data. Accordingly, RAID logic 122 performs the recovery operation by executing the one or more associated RAID transactions, as described in greater detail with regard to FIG. 5.

If in step 406 logic 122 determines that the load peak has not finished, then in step 402, RAID logic 122 continues to execute one or more application transactions, as previously discussed. Furthermore, RAID logic 122 may continue to process application data (i.e., by executing the one or more application transactions to HDD platters 160) until RAID logic 122 determines that the load peak has finished (step 406).

Figure 5:
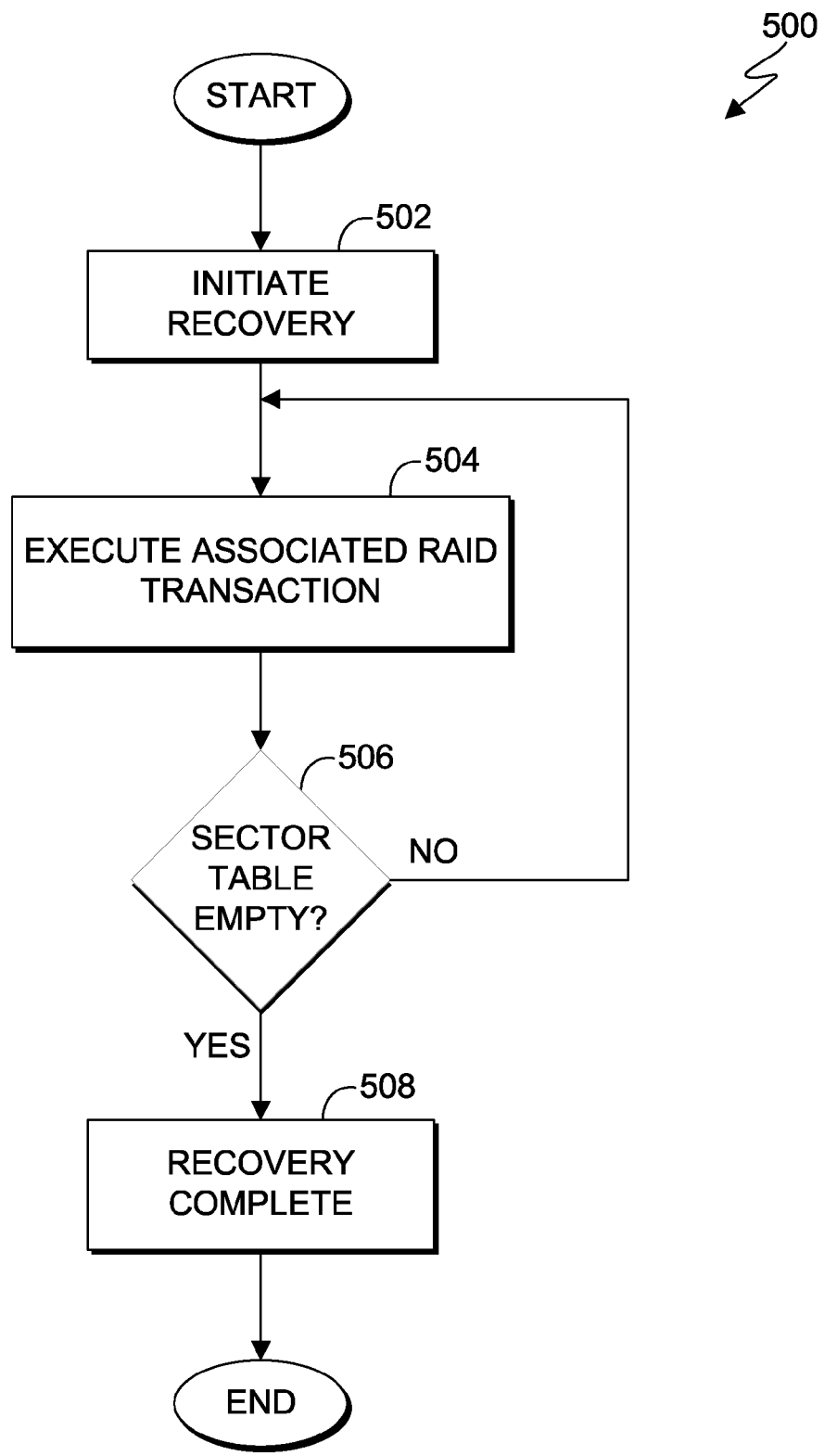
FIG. 5 is a flowchart illustrating operational steps for performing a recovery operation, in accordance with an embodiment of the present invention.

FIG. 5 is a flowchart 500 illustrating operational steps for performing a recovery operation, in accordance with an embodiment of the present invention. For example, the operational steps of flowchart 500 can be performed at step 408 of flowchart 400. In this embodiment, RAID logic 122 initiates the recovery operation responsive to determining that a load peak has finished (step 404 of FIG. 4). Furthermore, performing the recovery operation synchronizes parity data of application data to HDD 110 by executing one or more RAID transactions associated with application transactions that were previously written through to HDD platters 160. Accordingly, by performing the recovery operation, parity data of the application data is synchronized in HDD 110 and resiliency of the application data in HDD 110 is maintained. In one embodiment, parity data of the application data may be synchronized in a computer storage device, other than HDD 110, and resiliency of the application data in the computer storage device is maintained by performing the recovery operation. For example, resiliency application data executed to of one or more partitions of a flash storage device may be maintained by performing the recovery operation.

In step 502, RAID logic 122 initiates the recovery operation. In this embodiment, RAID logic 122 is implemented to determine a manner to initiate the recovery operation. For example, RAID logic 122 may determine to interleave the recovery operation (i.e., execution of one or more RAID transactions indicated by sector table 150) with execution of one or more application transactions, such that performance of HDD 110 is not impacted (i.e., decreased). In another example, RAID logic 122 may determine to interleave the recovery operation with execution of one or more application transactions, such that performance of another computer storage device, such as a flash storage device, is not impacted.

In step 504, RAID logic 122 executes one or more RAID transactions associated with the one or more application transactions. In this embodiment, the one or more application transactions were previously executed to HDD platters 160 during a write-through operation. In one embodiment, the one or more application transactions may have been previously executed to one or more partitions of a flash storage device during a write-through operation.

In step 506, RAID logic 122 determines whether sector table 150 is empty, indicating that all associated RAID transactions have been performed. In one embodiment, RAID logic 122 may determine whether a table, other than sector table 150, as implemented by a computer storage device, such as a flash storage device, is empty.

If in step 506 RAID logic 122 determines that the entries in sector table 150 are not empty, then in step 504, RAID logic 122 executes one or more RAID transactions associated with the one or more application transactions. Accordingly, the recovery operation will be performed as long as the number of entries in sector table 150 is not zero. In one embodiment, the recovery operation may be performed, such that a number of entries in a table, other than sector table 150, as implemented by another type of computer storage device (e.g., a flash storage device), is not zero.

If in step 506 RAID logic 122 determines that the entries in sector table 150 are empty, then in step 508, RAID logic 122 indicates that the recovery operation is complete. In this embodiment, RAID logic 122 signals computing environment 100 and components therein to continue processing application data. In one embodiment, RAID logic 122 may determine that entries in a table, other than sector table 150, as implemented by another type of computer storage device (e.g., a flash storage device), are empty.

Figure 6:
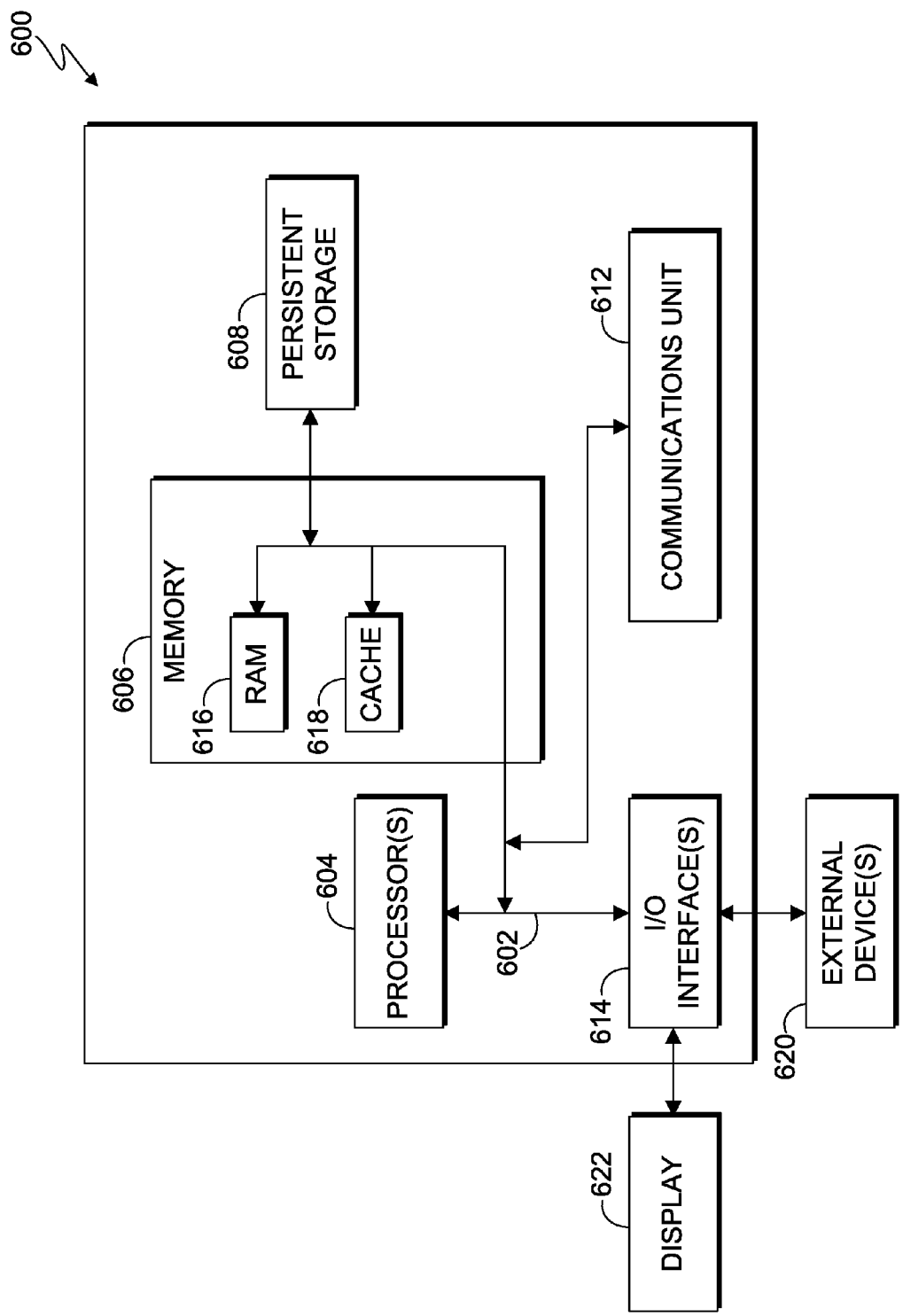
FIG. 6 is a block diagram of internal and external components of the computer systems of FIG. 1, in accordance with an embodiment of the present invention.

FIG. 6 is a block diagram of internal and external components of a computer system 600, which is representative of the computer systems of FIG. 1, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 612 provides for communications with other computer systems or devices via a network. In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620, such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, an application transaction, wherein executing the application transaction stores application data on a first portion of a computer storage device;
   generating, by the one or more computer processors, at least one Redundant Array of Independent Disks (RAID) transaction associated with the application transaction, wherein executing the at least one RAID transaction stores parity data of the application data on a second portion of the computer storage device;
   storing, by the one or more computer processors, the application transaction in a first buffer;
   responsive to determining that a storage capacity of a second buffer configured to store the at least one RAID transaction reaches a threshold, determining, by the one or more computer processors, whether to prioritize execution of the application transaction or to prioritize execution of the at least one RAID transaction;

responsive to determining to prioritize execution of the application transaction, performing, by the one or more computer processors, a write-through operation for the application transaction on the first portion of the computer storage device; and responsive to determining to prioritize execution of the at least one RAID transaction, executing, by the one or more computer processors, the at least one RAID transaction stored in the second buffer to store the parity data of the application data on the second portion of the computer storage device.

2. The method of claim 1, wherein the computer storage device is a hard disk drive having a plurality of platters.

3. The method of claim 2, wherein the first portion and the second portion are located on a same platter of the plurality of platters of the hard disk drive.

4. The method of claim 2, wherein the first portion and the second portion are located on separate platters of the plurality of platters of the hard disk drive.

5. The method of claim 1, wherein the computer storage device is a flash storage device.

6. The method of claim 1, wherein performing the write-through operation for the application transaction on the first portion of the computer storage device comprises:

executing, by the one or more computer processors, the application transaction to store the application data on the first portion of the computer storage device; and recording, by the one or more computer processors, in a sector table, an entry for the executed application transaction, wherein the entry includes a location of the application data of the executed application transaction.

7. The method of claim 6, further comprising:

determining, by the one or more computer processors, whether to perform a recovery operation; and responsive to determining to perform the recovery operation, executing, by the one or more computer processors, one or more RAID transactions for one or more entries in the sector table.

8. The method of claim 1, further comprising:

responsive to determining to prioritize execution of the at least one RAID transaction, suspending, by the one or more computer processors, execution of the application transaction until the at least one RAID transaction in the second buffer is executed.

9. The method of claim 7, further comprising:

responsive to determining to perform the recovery operation, executing, by the one or more computer processors, each of the one or more RAID transactions for each entry in the sector table.

10. The method of claim 7, wherein determining whether to perform the recovery operation comprises:

determining, by the one or more computer processors, whether a load peak condition is met, wherein the load peak condition is based, at least in part, on a number of application transactions stored in the first buffer.

11. The method of claim 1, further comprising:

responsive to determining that the storage capacity of the second buffer does not reach the threshold, storing, by the one or more computer processors, the at least one RAID transaction in the second buffer.

12. A computer program product comprising:

one or more non-transitory computer readable storage media and program instructions stored on the one or more non-transitory computer readable storage media, the program instructions comprising:

program instructions to receive an application transaction, wherein executing the application transaction stores application data on a first portion of a computer storage device;

program instructions to generate at least one Redundant Array of Independent Disks (RAID) transaction associated with the application transaction, wherein executing the at least one RAID transaction stores parity data of the application data on a second portion of the computer storage device;

program instructions to store the application transaction in a first buffer;

program instructions to, responsive to determining that a storage capacity of a second buffer configured to store the at least one RAID transaction reaches a threshold, determine whether to prioritize execution of the application transaction or to prioritize execution of the at least one RAID transaction;

program instructions to, responsive to determining to prioritize execution of the application transaction, perform a write-through operation for the application transaction on the first portion of the computer storage device; and responsive to determining to prioritize execution of the at least one RAID transaction, execute the at least one RAID transaction stored in the second buffer to store the parity data of the application data on the second portion of the computer storage device.

13. The computer program product of claim 12, wherein the program instructions to perform the write-through operation for the application transaction on the first portion of the computer storage device comprise:

program instructions to execute the application transaction; and program instructions to record, in a sector table, an entry for the executed application transaction, wherein the entry includes a location of the application data of the executed application transaction.

14. The computer program product of claim 13, wherein the program instructions stored on the one or more non-transitory computer readable storage media further comprise:

program instructions to determine whether to perform a recovery operation; and program instructions to, responsive to determining to perform the recovery operation, execute one or more RAID transactions for one or more entries in the sector table.

15. The computer program product of claim 12, wherein the program instructions stored on the one or more non-transitory computer readable storage media further comprise:

program instructions to, responsive to determining to prioritize execution of the at least one RAID transaction, suspend execution of the application transaction until the at least one RAID transaction in the second buffer is executed.

16. The computer program product of claim 14, wherein the program instructions stored on the one or more non-transitory computer readable storage media further comprise:

program instructions to, responsive to determining to perform the recovery operation, execute each of the one or more RAID transactions for each entry in the sector table.

17. The computer program product of claim 14, wherein the program instructions to determine whether to perform the recovery operation comprise:
program instructions to determine whether a load peak condition is met, wherein the load peak condition is based, at least in part, on a number of application transactions stored in the first buffer.

18. The computer program product of claim 12, wherein the program instructions stored on the one or more non-transitory computer readable storage media further comprise:
program instructions to, responsive to determining that the storage capacity of the second buffer does not reach the threshold, store the at least one RAID transaction in the second buffer.

19. A computer system comprising:
one or more computer processors;
one or more non-transitory computer readable storage media;
program instructions stored on the one or more non-transitory computer readable storage media for execution by at least one of the one or more computer processors, the program instructions comprising:
program instructions to receive an application transaction, wherein executing the application transaction stores application data on a first portion of a computer storage device;
program instructions to generate at least one Redundant Array of Independent Disks (RAID) transaction associated with the application transaction, wherein executing the at least one RAID transaction stores parity data of the application data on a second portion of the computer storage device;
program instructions to store the application transaction in a first buffer;
program instructions to, responsive to determining that a storage capacity of a second buffer configured to store the at least one RAID transaction reaches a threshold, determine whether to prioritize execution of the application transaction or to prioritize execution of the at least one RAID transaction;
program instructions to, responsive to determining to prioritize execution of the application transaction, perform a write-through operation for the application transaction on the first portion of the computer storage device; and
responsive to determining to prioritize execution of the at least one RAID transaction, execute the at least one RAID transaction stored in the second buffer to store the parity data of the application data on the second portion of the computer storage device.

20. The computer system of claim 19, wherein the program instructions to perform the write-through operation for the application transaction on the first portion of the computer storage device comprise:
program instructions to execute the application transaction; and
program instructions to record, in a sector table, an entry for the executed application transaction, wherein the entry includes a location of the application data of the executed application transaction.

* * * * *